Patented May 26, 1936

2,042,222

UNITED STATES PATENT OFFICE 2,042,222

TREATMENT OF UNSATURATED HALIDES

Herbert P. A. Groll and James Burgin, Oakland, Calif., assignors to Shell Development Company, San Francisco, Calif., a corporation of Delaware No Drawing. Application June 23, 1934, Serial No. 732,079

20 Claims. (Cl. 260—162)

This invention relates to a novel process for the treatment of unsaturated organic halides which comprises reacting an unsaturated halide of the class consisting of those unsaturated halides containing at least four carbon atoms and those containing a tertiary carbon atom, particularly an unsaturated tertiary carbon atom, with a strong mineral oxyacid to yield an acid- or neutral halogenated alkyl ester, and further comprises treating the resulting mineral acid ester with water or an organic hydroxy compound whereby a halogenated alcohol or a halogenated ether, respectively, may be obtained.

Another object of the present invention is to obtain a class of hitherto unknown halogenated alkyl esters, which novel esters are prepared by reacting an organic halide containing at least four carbon atoms with a strong mineral oxyacid.

More particularly, the present invention is concerned with a process for the production of halogenated alcohols, particularly halogenated tertiary alcohols, which comprises reacting unsaturated halides, particularly those possessing an unsaturated tertiary carbon atom, with a strong mineral oxyacid and reacting the resulting halogenated acid- or neutral alkyl ester with water.

It is known that unsaturated normal alkyl chain halides have been reacted with a strong polybasic mineral a c i d. β-chlorpropylene ($CH_2=CCl-CH_3$) was reacted with sulphuric acid to form the ester of the probable formula $CH_3-C(HSO_4)_2-CH_3$, which on hydrolysis yielded acetone. It is to be noted that the addition of sulphuric acid was accompanied by the liberation of hydrogen chloride resulting in the formation of a non-halogenated carbonylic compound. β-chlorpropylene is an unsaturated chloride possessing three carbon atoms and is of the vinyl type, that is, the halogen atom is linked directly to an unsaturated carbon atom. Several investigators have reacted the simplest non-vinylic unsaturated halide, namely allyl chloride ($CH_2=CH-CH_2Cl$) with concentrated sulphuric acid solutions and obtained small amounts of an unstable chlorinated allyl ester of sulphuric acid, which ester on hydrolysis yielded propylene chlorhydrin. The yields of propylene chlorhydrin obtainable even under the most favorable conditions were too low to warrant consideration of this method for the economical technical scale production of this compound. The unsatisfactory results attained may be attributed to the occurrence of undesirable side reactions such as polymerization and condensation of the reactant and/or reaction products.

In general, a study of the prior art reveals the fact that the efforts to react unsaturated halides with a strong mineral oxyacid have been confined to the treatment of normal, alkyl chain unsaturated halides possessing three carbon atoms with a polybasic mineral acid. All attempts to prepare a halogenated alkyl ester of sulphuric acid by treating a vinyl type unsaturated halide have met with no success due to the fact that the esterification is accompanied by decomposition and hydrogen halide generation.

Now we have found that, in accordance with the present invention, we may react a vinyl type halide possessing an unsaturated tertiary carbon atom with a strong mineral oxyacid without the substantial liberation of hydrogen halide, to form a novel class of halogenated alkyl esters. Further, we have found that our process is applicable with excellent results to the treatment of normal or iso alkyl chain non-vinylic unsaturated halides possessing at least four carbon atoms to the molecule. Our method is particularly applicable to the treatment of unsaturated halides possessing an unsaturated tertiary carbon atom and wherein a halogen atom or atoms may be linked directly to saturated or unsaturated carbon atoms.

The present invention provides a process whereby organic halides containing at least four carbon atoms may be reacted with a strong mono- or polybasic oxyacid such as sulphuric, phosphoric, phosphorous, nitric, chloric, bromic, meta-phosphoric, and the like to yield a novel class of halogenated neutral or acid-alkyl mineral acid esters wherein a secondary or tertiary carbon atom of the halogenated alkyl radical or radicals is linked directly to the oxyacid radical. These novel esters, which may be obtained in excellent yields, are in general relatively unstable. On prolonged storage, they may decompose and/or polymerize, therefore, we prefer not to isolate them but to utilize them as intermediates in the preparation of certain useful alcohols and ethers in accordance with the modes of treatment hereinafter described. It is, however, to be understood that if desired the alkyl esters may, in a variety of suitable manners, be isolated in a substantially pure state and stabilized by means of a suitable stabilizing agent or agents; or by keeping them under conditions of temperature and pressure at which the occurrence of decomposition and/or polymerization reactions is or are substantially obviated.

The unsaturated organic halides which may be treated in accordance with our invention are characterized by possessing at least four carbon atoms and at least one halogen atom to the molecule. The unsaturated halide may comprise a normal or iso alkyl chain which may or may not be attached to a cyclic radical as of the aromatic, alicyclic and heterocyclic series, or the alkyl chain may comprise an alicyclic structure. If the organic halide contains only primary and secondary or only secondary unsaturated carbon atoms, the halogen atom should be linked to a saturated carbon atom. In an organic halide possessing an unsaturated tertiary carbon atom, a halogen atom may be linked directly to a saturated or unsaturated carbon atom.

A preferred group of unsaturated halides includes compounds such as

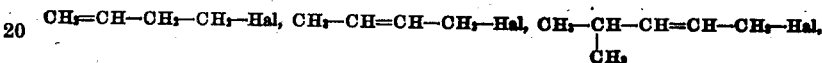
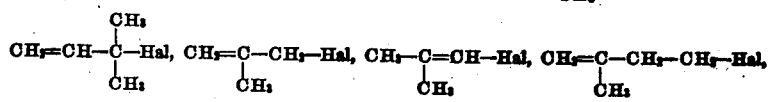
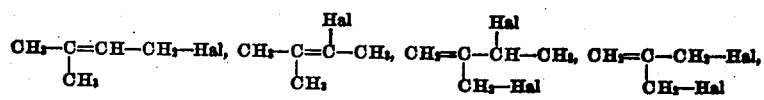
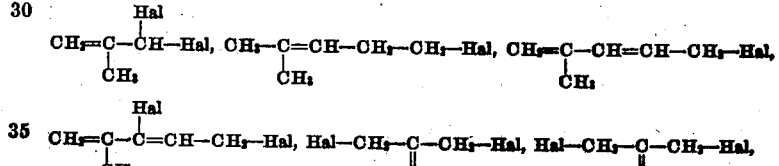
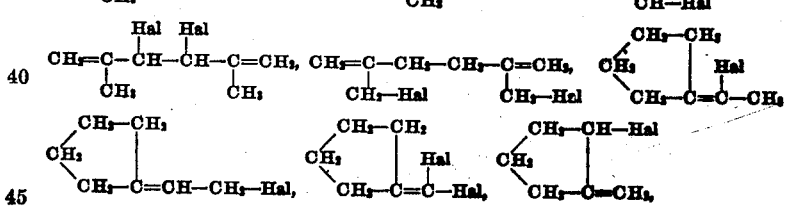
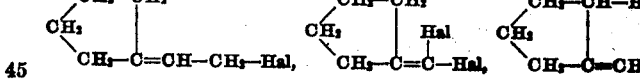
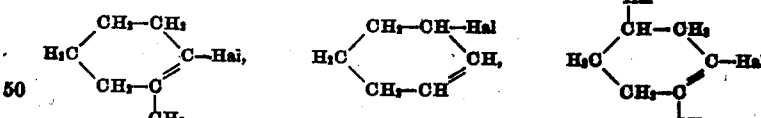
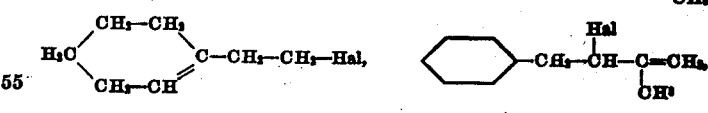
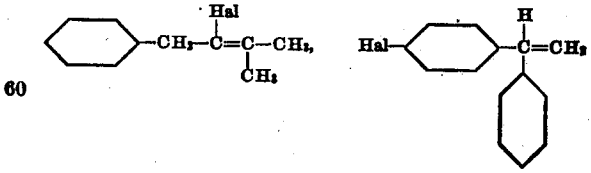

as well as their homologues, analogues and suitable substitution products.

The term "mineral oxyacid" as used in the specification and the appended claims is intended to designate those mono- and polybasic acids containing at least one oxygen atom and an atom of a mineral acid constituent such as S, N, P, halogens and the like, said acid being capable of reacting with an unsaturated halide to form an ester in accordance with the principles of the present invention.

The first step in the execution of our invention comprises reacting a suitable unsaturated halide with a strong mineral oxyacid, which acid may be applied in anhydrous form or as a preferably concentrated solution in water and/or any other suitable solvent. The oxyacid adds into the double bond or bonds of the halide resulting in the formation of the corresponding neutral or acid alkyl ester. The reaction assumed to occur may be represented by the equation for the specific reaction of isobutenyl chloride and sulphuric acid as follows:

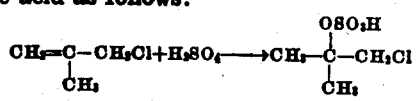

If the halo-alkyl acid sulphate thus formed is contacted with isobutenyl chloride for a sufficiently long period of time under the conditions

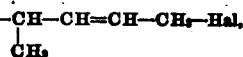
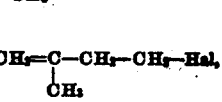
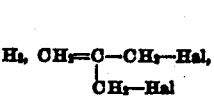
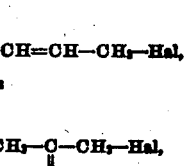
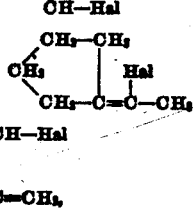
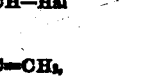
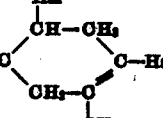
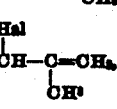
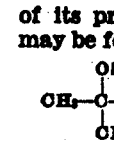

of its preparation, the di-(halo-alkyl) sulphate may be formed in accordance with the equation

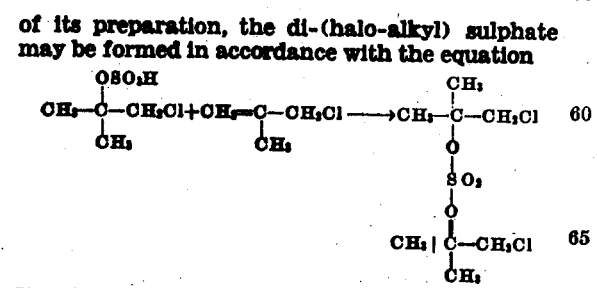

It will be evident that if substantially only the di-(halo-alkyl) sulphate is desired, this compound may be prepared directly by contacting the reactants in the molal ratio of at least two mols of isobutenyl chloride to one mol of sulphuric acid under suitable conditions and for a sufficiently long period of time to ensure completion of the reaction.

In case that isobutenyl chloride is reacted with a tribasic acid such as H₃PO₄, it will be seen that under the proper conditions any one of three halo-alkyl phosphates or mixtures thereof may be obtained. These esters may be represented by the formulae RH₂PO₄, R₂PO₄ and R₃PO₄, wherein R represents the radical

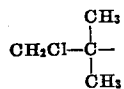

In general, the halo-alkyl esters obtained by our method may be represented by the formula R$_x$YH$_{(n-x)}$ wherein Y represents the negative radical of an oxygen-containing mineral acid having a valence represented by $n$, R representing a halogenated alkyl radical and $x$ represents the number of halogenated alkyl radicals contained in the molecule. When $x$ and $n$ in the above formula are equal, all of the acid hydrogen atoms have been replaced by halo-alkyl groups and the formula becomes R$_n$Y.

After the selected unsaturated halide has been substantially completely reacted to form a halo-alkyl oxyacid ester, we may, without resorting to the isolation of the halo-alkyl ester or esters, treat the reaction mixture in accordance with one of the following modes of procedure, depending on the reaction product desired.

If we desire a halogenated alcohol as the reaction product, we may effect the hydrolysis of the halo-alkyl ester by adding water to the, preferably cooled, reaction mixture. The halogenated alcohols may be recovered from the diluted acid, neutral or moderately basic reaction mixture in a variety of suitable manners as hereinafter set forth.

If we desire a halogenated ether as the reaction product, the halo-alkyl ester is reacted with a suitable organic hydroxy compound. The probable reaction may be represented by the equation for the specific reaction of the halo-alkyl acid sulphate

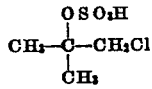

and ethyl alcohol. The reaction is assumed to occur as follows:

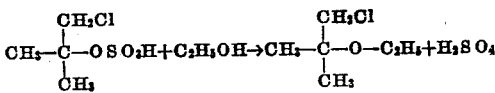

The resulting halo-alkyl ether may be recovered from the acid, neutral or alkaline reaction mixture in a variety of suitable ways.

The present invention is particularly concerned with the production of halogenated neutral and acid alkyl esters, halogenated alcohols and/or halogenated ethers. We have also found that the more stable halo-alkyl esters may be reacted with a suitable carboxylic acid and the corresponding halo-alkyl carboxylic acid ester obtained.

It is to be understood that our invention may be executed employing a wide variety of strong mineral acting oxyacids. A preferred group of suitable acids includes the strong oxyacids such as HClO₂, HClO₃, HBrO₃, HClO₄, HPO₃, HNO₃, H₂SO₄, H₂S₂O₇, H₄P₂O₆, H₃PO₃, H₃PO₄, H₄P₂O₇ as well as benzene sulphonic acid and its homologues, analogues and the like. The strong polybasic oxacids such as H₂SO₄ and H₃PO₄ are particularly adaptable to use in the execution of the present invention. For purposes of economy, availability and general convenience of operation, we prefer, in the majority of cases, to employ sulphuric acid (H₂SO₄). The sulphuric acid is usually employed as an aqueous solution having a sulphuric acid concentration in the range of about 60% to about 100%. The best results are usually obtained with those aqueous solutions containing from 80% to 90% H₂SO₄. When lower acid concentrations are used, the reaction may proceed too slowly and incompletely for general practical purposes. The use of sulphuric acid in concentrations in excess of about 90% is in some cases disadvantageous in that such highly concentrated solutions tend to favor decomposition of the unsaturated halide thus liberating hydrogen halides and resulting in lower yields of the desired reaction product due to the occurrence of undesirable polymerization and condensation reactions. The higher acid concentrations may in some instances be advantageously used if the reaction is conducted at lower temperatures and/or the contact time of the reactants is shortened. When acids other than sulphuric are used, such acids may be applied in corresponding concentrations depending on the strength and activity of said acid or acids as compared to sulphuric acid. In addition, the use of weaker acids may require the employment of higher operating temperatures.

Two types of unsaturated halides are encountered in the execution of our invention. Those unsaturated halides wherein at least one halogen atom is linked to an unsaturated carbon atom and those wherein a halogen atom or atoms is or are linked to saturated carbon atoms, regardless of the position of the halogenated carbon atom or atoms with respect to the double bond. Members of this first group of unsaturated halides are, for the purpose of this invention, designated as vinyl type halides. We do not desire to execute our invention with vinyl type halides containing only primary and secondary or only secondary unsaturated carbon atoms, due to the fact that when such halides are reacted with a strong mineral oxyacid, hydrogen halide is usually liberated in substantial amounts. We may, however, advantageously employ those vinyl type halides wherein at least one halogen atom is linked directly to an unsaturated carbon atom vicinal to an unsaturated tertiary carbon atom. Isocrotyl halides

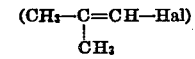

are the simplest members of this class of vinyl type halides which contain an unsaturated tertiary carbon atom.

We have found that the vinyl type halides which we may employ are in general less reactive to strong mineral oxyacids than the other suitable types of halides, consequently, we prefer to employ the stronger acids in high concentrations and employ higher temperatures and/or longer contact times when executing our invention with the former.

We prefer to effect the reaction of a suitable unsaturated halide and a suitable mineral oxyacid at a temperature at which the reaction proceeds rapidly with a minimum of decomposition and polymerization. This reaction is preferably effected in a temperature range up to about 25° C., although in some cases temperatures substantially above 25° C. may be advantageously applied. The optimum reaction temperature will usually be dependent on the specific reactants, the concentration and strength of the acid applied and/or the contact time of the reactants. To avoid polymerization losses due to local overheating, we prefer to slowly add the mineral acid or solution thereof to a stoichiometrical excess of the unsaturated halide. The reaction is, in the cases tested, exothermic. The heat liberated usually necessitates cooling of the reaction mixture. Agitation of the reaction mixture is advantageous since it may afford more efficient contact of the reactants and aid in maintaining a more uniform temperature throughout the reaction mixture. It may be desirable to effect the reaction in the presence of a suitable inert organic compound such as an ether, ester, hydrocarbon, halogenated hydrocarbon and the like.

The halogenated alkyl esters thus formed may be mono- or polyalkyl, or the reaction mixture may comprise a mixture of mono- and polyalkyl esters. By regulating the relative amounts of the reactants and/or their contact times, the desired neutral or acid ester may be obtained in those cases where polybasic acids are used. In any case, we prefer to operate with an amount of unsaturated halide sufficient to react with substantially all of the oxyacid applied. Any excess of unsaturated halide may be recovered in a later stage of the process. In general, the mono-(halo-alkyl) sulphates are relatively insoluble in an excess of the corresponding unsaturated halide but soluble in sulphuric acid, while the dihalo-alkyl sulphates are soluble in the unsaturated halide as well as in sulphuric acid. In the latter case, we obtain homogeneous reaction mixtures, while in the former case the mono-(halo-alkyl) sulphate may prior to its further treatment, be separated from the excess of unsaturated halide by stratification or like means.

If the object of the operation is to prepare halogenated alcohols, we may proceed as follows without resorting to separation of the constituents of the reaction mixture. When substantially all of the mineral oxyacid has been reacted, the reaction mixture, is preferably immediately diluted with water, during which dilution the temperature of the reaction mixture is maintained preferably at or below about 25° C. Enough water is added to the reaction mixture to effect the substantially complete hydrolysis of the halo-alkyl ester or esters contained therein. We have found that the halo-alkyl sulphates are readily and substantially completely hydrolyzed by the simple expedient of adding enough water to the reaction mixture to reduce its sulphuric acid concentration to about 10% to 15% $H_2SO_4$. A convenient method of effecting this dilution comprises the slow addition of the reaction mixture to a mixture of ice and/or water, said ice and/or water being present in an amount sufficient to reduce the acid concentration to the desired value.

The resulting halogenated alcohol may be recovered from the relatively dilute acidic mixture (solution or suspension) in a wide variety of suitable manners depending on the specific halogenated alcohol to be recovered and on the particular taste of the operator. In many cases, we prefer to recover the halogenated alcohol by subjecting the diluted acidic reaction mixture to a distillation or fractionation treatment under a subatmospheric or atmospheric pressure whereby the product is usually recovered per se or as a constant boiling mixture with water and/or the unreacted halide, if any is present. In some cases, we prefer to effect this distillation under a subatmospheric pressure, due to the fact that in some cases the halogenated alcohol may be rearranged to a carbonylic compound at the kettle temperature necessary to effect the distillation at atmospheric pressure. If desired, the dilute acidic reaction mixture may be neutralized by the addition of an equivalent amount of a suitable basic substance. In general, the reaction product may be recovered from the aqueous acidic, or neutral reaction mixture by any suitable means such as fractionation, stratification, dehydration, extraction and the like.

When distillation methods of recovery are resorted to, the halogenated alcohol may be recovered from the condensate, which may contain in addition to the product, water and other constituents of the reaction mixture, in a variety of suitable ways such as by stratification, fractionation, extraction, use of drying agents and the like.

If the object of the invention is to prepare a halogenated ether, we may proceed in a manner substantially as described for the preparation of halogenated alcohols. The reaction mixture as obtained in the execution of the primary step of our process is preferably slowly added to an excess of a suitable hydroxy compound capable of reacting with the halo-alkyl ester or esters to form a halogenated ether containing the halogenated alkyl radical or radicals linked to the ethereal oxygen atom or atoms of the organic residue of the organic hydroxy compound reacted. A group of suitable hydroxy compounds includes the saturated monohydric alcohols, the polyhydric alcohols such as the glycols, polyglycols, glycerol and its homologues and the like as well as suitable cyclic hydroxy compounds such as phenol, cresol, etc. Unsaturated alcohols may also be employed in those cases where the unsaturated alcohol and/or resulting unsaturated ether is sufficiently stable under the conditions of the operation. The expression "alcohol radical" in the claims is also intended to include the equivalent and analogous phenolic radicals such as exemplified above.

The alcohols employed are preferably of primary or secondary character. Suitable substitution products of the above mentioned compounds as well as their homologues and analogues may also be used. The resulting halogenated ether may be recovered from the acid reaction mixture in a wide variety of manners. For example, the acid concentration therein may be reduced by dilution with water. The reaction product may be distilled from the dilute acid reaction mixture, usually as a constant boiling mixture with water and/or the excess of alcohol preferably employed. Alternatively, the reaction mixture may be neutralized by the addition thereto of an equivalent amount of a basic substance and the product distilled from the neutral or slightly basic mixture. In some instances, it may be desirable to recover the product by employing means such as stratification and/or extraction.

When the halogenated ethers are recovered by distillation means, the condensate may contain, in addition to the product, other vaporizable constituents of the reaction mixture. The reaction product may be recovered therefrom in a wide variety of suitable manners such as by resorting to the use of means such as stratification, fractionation, extraction, dehydration and the like.

We have found that, in some cases, when a strong mineral oxyacid is reacted with an excess of an unsaturated halide, the excess of unsaturated halide, which does not enter into the primary reaction to form the ester, may be partially or substantially converted to an unsaturated halide or halides isomeric with the unsaturated halide initially reacted. This conversion is due to the occurrence, to a certain extent, of a decomposition reaction whereby the oxyacid is split from the halo-alkyl ester resulting in the formation of the initially applied halide and/or compounds isomeric to it. This decomposition reaction is usually favored by relatively high reaction and/or hydrolysis temperatures and/or relatively long contact times of the reactants.

The following specific examples are included for the purpose of illustrating preferred modes of execution of our invention. It is to be understood that it is not our intention to limit our invention to the specific operating conditions set forth in the following examples.

Example I 70.5 gm. (1 mol.) of isocrotyl chloride

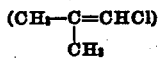
$$(CH_3-C=CHCl)$$
$$\vert$$
$$CH_3$$

were vigorously stirred while 0.75 mols of sulphuric acid, in an aqueous 90% $H_2SO_4$ solution, was continuously added to it over a period of about 30 minutes. While the sulphuric acid solution was being added, the temperature of the reaction mixture was kept at or below about 5° C. After all the sulphuric acid had been added, the reaction mixture was agitated and its temperature maintained at about 10° C. for an additional 2 hours. At the end of this time, the reaction mixture was poured on ice and thereby diluted until the sulphuric acid concentration of the reaction mixture was about 12%.

The diluted reaction mixture was fractionated. The reaction product was recovered as an azeotropic mixture with water boiling at 93° C. under atmospheric pressure. This azeotropic mixture was stratified and the non-aqueous layer dried and fractionated.

The reaction product was mono-chlor tertiary butyl alcohol of the formula $$CH_3-COH-CH_2Cl$$
$$\vert$$
$$CH_3$$

The reaction product was obtained in a yield of 93% calculated on the isocrotyl chloride applied.

About 0.6 mols of a mixture consisting of unreacted isocrotyl chloride and its isomer, isobutenyl chloride

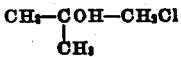
$$(CH_2=C-CH_2Cl)$$
$$\vert$$
$$CH_3$$

were recovered.

Example II 16.4 kilos of a technical mixture of isomeric unsaturated chlorides consisting of 97% isobutenyl chloride and 3% isocrotyl chloride was placed in a lead-lined reaction vessel equipped with means for agitating and cooling its contents. 11.1 kilos of an aqueous 80% $H_2SO_4$ solution was continuously added to the vigorously agitated mixture of halides at an average rate of about 123.3 gm. of $H_2SO_4$ per minute while the contents of the reaction vessel were kept at a temperature of about 0° C. to 5° C.

After all of the sulphuric acid had been added, the reaction mixture was agitated for an additional time of about 2.5 hours, during which time its temperature was allowed to rise to about 15° C. The reaction mixture was withdrawn from the reaction vessel and passed slowly into an agitated mixture of ice and water contained in a lead-lined fractionating still. The ice and water were present in sufficient quantity to dilute the reaction mixture to the extent that the sulphuric acid concentration in the still was about 10%.

The diluted acidic mixture in the still was fractionated. The first cut which boiled in a temperature range of from 61° C. to 65° C. consisted of 0.3 kilo of a mixture of unreacted unsaturated halides. This cut was conducted back to the reaction vessel for reutilization therein. The second cut which boiled in a temperature range of from 92° C. to 95° C. was the azeotropic mixture of α-isobutylene chlorhydrin and water. This azeotropic mixture was salted out, allowed to stratify and the non-aqueous layer separated and distilled.

A total of 19.6 kilos of α-isobutylene chlorhydrin were obtained. This represents a yield of 94.5% calculated on the unsaturated halides applied.

Example III 180 gm. of dichloro diisobutenyl of the formula

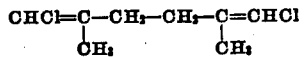
$$CHCl=C-CH_2-CH_2-C=CHCl$$
$$\vert \qquad\qquad\quad \vert$$
$$CH_3 \qquad\qquad CH_3$$

were placed in a reaction vessel and rapidly stirred while 220 gm. of an aqueous 80% sulphuric acid solution were continuously added at an average rate of about 4.9 gm. of $H_2SO_4$ solution per minute. While the sulphuric acid solution was added, the contents of the reaction vessel were kept below a temperature of about 5° C. After all of the sulphuric acid had been added, the reaction mixture was stirred for 1 hour and during this time the temperature of the reaction mixture was allower to gradually rise to about 15° C. At the end of this time the reaction mixture was poured into a mixture of ice and water in sufficient quantity to reduce the acid concentration of the resulting mixture to about 15%.

The diluted reaction mixture was extracted with ethyl ether. The non-aqueous layer was separated, dried and fractionated under a subatmospheric pressure.

The reaction product which was obtained in a yield of 75%, was identified as diisobutenyl dichlorhydrin of the formula

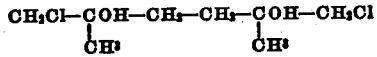
$$CH_2Cl-COH-CH_2-CH_2-COH-CH_2Cl$$
$$\vert \qquad\qquad\qquad\quad \vert$$
$$CH_3 \qquad\qquad\qquad CH_3$$

Example IV 22 gm. of 1-phenyl-1-bromophenyl ethylene

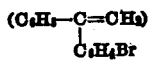
$$(C_6H_5-C=CH_2)$$
$$\vert$$
$$C_6H_4Br$$

was slowly introduced into 10 gm. of a 77% aqueous solution of sulphuric acid while the reaction mixture was continuously agitated and kept at a temperature below about 5° C. After all the sulphuric acid had been added, the reaction mixture was poured on ice and diluted to about 6 times its volume.

The diluted mixture was extracted with ethyl ether. The non-aqueous phase was separated, dried and distilled. The reaction product was 1-phenyl-1-bromophenyl ethanol-1 of the formula

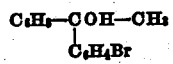
$$C_6H_5-COH-CH_3$$
$$\vert$$
$$C_6H_4Br$$

If the object of our invention is the preparation of halohydrins, we have found that if the unsaturated halide possesses an unsaturated tertiary carbon atom, the best results are obtained when said unsaturated halide possesses a halogen atom linked to a primary carbon atom. For example, we have treated the unsaturated chlorides of the structures

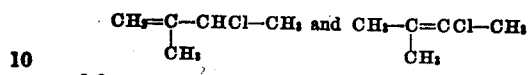

and found that only low yields of the corresponding chlorhydrin could be obtained.

We have found that the best results are obtained with unsaturated halides which do not possess a quaternary, tertiary or aromatic carbon atom in a position once removed from an unsaturated tertiary carbon atom. For example compounds such as

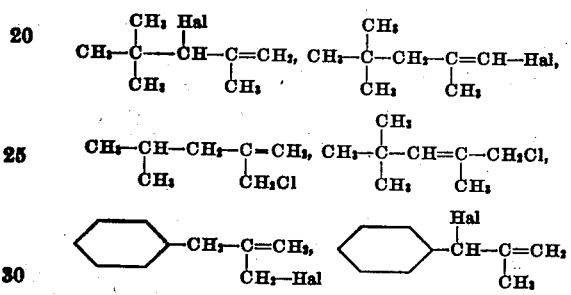

and the like, generally require more vigorous treatment in order to satisfactorily effect their conversion, and, in addition, the yields are relatively lower. In some cases, the primary reaction with members of this group of halides is accompanied by the decomposition of the halide, generally resulting in the liberation of hydrogen halide and the formation of isomeric halides, olefinic hydrocarbons and polymerization and condensation products. Some depolymerization may also occur resulting in the formation of compounds possessing fewer carbon atoms. These undesirable side reactions occasion a decreased yield of the desired reaction product.

Our invention may be executed in a batch or intermittent manner but is preferably executed continuously. The present invention is adaptable to the economical, technical scale production of halogenated alcohols, particularly the halogenated tertiary alcohols as well as halogenated ethers. In a technical scale production, the design of a suitable apparatus and certain modifications in the mode of operation of the same will be apparent to those skilled in the art to which our invention pertains.

The halogenated alcohols and esters prepared by our method may be used in the liquid state as solvents in numerous solvent and extraction processes such as for the refining of mineral and vegetable oils. They are, in general, relatively high boiling compounds which may form azeotropes with water, hence they may be advantageously used as dehydrating agents. They may be used as intermediates in the preparation of many useful compounds. For example, the halogenated alcohols may be used as intermediates in the preparation of polyhydric alcohols, ethers, esters, carbonylic compounds and the like.

While we have in the foregoing described in some detail the preferred embodiments of our invention and some variants thereof, it will be understood that this is only for the purpose of making the invention more clear and that it is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the treatment of unsaturated halides which comprises reacting an unsaturated halide containing at least four carbon atoms and an olefinic linkage between two aliphatic carbon atoms and devoid of conjugated double bonds with a strong mineral-acting oxyacid, said unsaturated halides being devoid of allene structures.

2. A process for the treatment of unsaturated halides which comprises reacting an unsaturated halide containing at least four carbon atoms and an olefinic linkage between two aliphatic carbon atoms and devoid of conjugated double bonds and wherein halogen atoms are linked only to saturated carbon atoms with a strong mineral-acting oxyacid, said unsaturated halides being devoid of allene structures.

3. A process for the treatment of unsaturated halides which comprises reacting an organic halide containing an olefinic linkage between two aliphatic carbon atoms at least one of which is tertiary with a strong mineral-acting oxyacid.

4. A process for the treatment of unsaturated halides which comprises reacting an unsaturated halide containing at least four carbon atoms and an olefinic linkage between two aliphatic carbon atoms and devoid of conjugated double bonds with a strong mineral-acting oxyacid and treating the resulting reaction mixture with a compound of the general formula R—OH wherein R represents hydrogen or —OR represents an alcohol radical, said unsaturated halides being devoid of allene structures.

5. A process for the treatment of unsaturated halides which comprises reacting an unsaturated halide containing at least four carbon atoms and an olefinic linkage between two aliphatic carbon atoms and devoid of conjugated double bonds and wherein halogen atoms are linked only to saturated carbon atoms with a strong mineral-acting oxyacid and treating the resulting reaction mixture with water, said unsaturated halides being devoid of allene structures.

6. A process for the treatment of unsaturated halides which comprises reacting an organic halide containing an olefinic linkage between two aliphatic carbon atoms at least one of which is tertiary with a strong mineral-acting oxyacid and treating the resulting reaction mixture with water.

7. A process for the treatment of unsaturated halides which comprises reacting an unsaturated halide containing at least four carbon atoms and an olefinic linkage between two aliphatic carbon atoms and devoid of conjugated double bonds and wherein halogen atoms are linked only to saturated carbon atoms with a strong mineral-acting oxyacid and treating the resulting reaction mixture with an organic hydroxy compound, said unsaturated halides being devoid of allene structures.

8. A process for the treatment of unsaturated halides which comprises reacting an organic halide containing an olefinic linkage between two aliphatic carbon atoms at least one of which is tertiary with a strong mineral-acting oxyacid and treating the resulting reaction mixture with an organic hydroxy compound.

9. The step which comprises treating the reaction mixture of an organic halide containing an unsaturated tertiary carbon atom with a compound of the general formula R—OH wherein R represents hydrogen or —OR represents an alcohol radical.

10. The step which comprises treating a halogenated alkyl ester of a strong mineral-acting oxyacid which is linked thereto by a tertiary carbon atom with a compound of the general formula R—OH wherein R represents hydrogen or —OR represents an alcohol radical.

11. A process for the treatment of unsaturated halides which comprises reacting an organic halide containing an olefinic linkage between two aliphatic carbon atoms at least one of which is tertiary with sulphuric acid at a temperature of from 0° C. to 25° C.

12. A process for the treatment of isobutenyl chloride which comprises reacting isobutenyl chloride with sulphuric acid.

13. A process for the treatment of isocrotyl chloride which comprises reacting isocrotyl chloride with sulphuric acid.

14. The esters of the formula $R_xYH_{(n-x)}$ wherein R represents a halogenated monovalent alkyl radical containing at least four carbon atoms and is linked to the acid radical by a carbon atom which is not attached to more than one hydrogen atom, and Y represents the negative radical of an acid of the class consisting of strong mineral-acting oxyacids containing sulphur, phosphorus or halogen, said negative radical having a valence of $n$, $x$ representing the number of alkyl radicals.

15. The esters of the formula $R_xYH_{(n-x)}$ wherein R represents a halogenated monovalent alkyl radical containing at least four carbon atoms and is linked to the acid radical by a carbon atom which is not attached to more than one hydrogen atom, and Y represents the negative radical of a strong polybasic mineral-acting oxyacid having a valence of $n$, $x$ representing the number of alkyl radicals.

16. The esters of the formula $R_xYH_{(n-x)}$ wherein R represents a chlorinated monovalent radical containing at least four carbon atoms and is linked to the acid radical by a carbon atom which is not attached to more than one hydrogen atom, and Y represents the negative radical of a strong mineral-acting oxyacid having a valence of $n$, $x$ representing the number of alkyl radicals.

17. The esters of the formula $R_xYH_{(n-x)}$ wherein R represents a chlorinated monovalent alkyl radical contaning a tertiary carbon atom and is linked to the acid radical by a carbon atom which is not attached to more than one hydrogen atom, and Y represents the negative radical of a strong mineral-acting oxyacid having a valence of $n$, $x$ representing the number of alkyl radicals.

18. The esters of the formula $R_xYH_{(n-x)}$ wherein R represents the radical

and Y represents the negative radical of a strong mineral-acting oxyacid having a valence of $n$.

19. A process for the treatment of unsaturated halides which comprises reacting an unsaturated halide possessing an olefinic linkage between two aliphatic carbon atoms and devoid of conjugated double bonds and containing at least four carbon atoms with a strong mineral-acting oxy-acid and treating the resulting reaction mixture with a compound of the general formula R—OH, wherein R represents hydrogen or an alkyl radical, said unsaturated halides being devoid of allene structures.

20. A process for the treatment of unsaturated halides which comprises reacting an unsaturated halide possessing an olefinic linkage between two aliphatic carbon atoms and devoid of conjugated double bonds at least one of which is tertiary with a strong mineral-acting oxy-acid and treating the resulting reaction mixture with a compound of the general formula R—OH, wherein R represents hydrogen or an alkyl radical, said unsaturated halides being devoid of allene structures.

HERBERT P. A. GROLL.
JAMES BURGIN.